United States Patent [19]

Hynes

[11] 3,936,799
[45] Feb. 3, 1976

[54] AUTOMOTIVE VEHICLE ROTARY DISPLAY AND WARNING DEVICE

[75] Inventor: Roy G. Hynes, Flushing, Mich.

[73] Assignee: General Motors Corporation, Detroit, Mich.

[22] Filed: Aug. 1, 1973

[21] Appl. No.: 384,612

[52] U.S. Cl. ............ 340/52 F; 340/378 R; 340/379; 340/412
[51] Int. Cl.² .......................................... G08B 19/00
[58] Field of Search ............ 340/21, 52 R, 52 F, 27, 340/225, 324 R, 324 B, 325, 373, 378 R, 379, 412, 414, 415

[56] References Cited
UNITED STATES PATENTS

| | | | |
|---|---|---|---|
| 2,737,650 | 3/1956 | Bush et al. | 340/325 |
| 3,036,292 | 5/1962 | Beall | 340/324 R |
| 3,566,401 | 2/1971 | Smith et al. | 340/52 F |
| 3,660,814 | 5/1972 | Fales | 340/52 F |
| 3,835,450 | 9/1974 | Reck | 340/52 F |

Primary Examiner—John W. Caldwell
Assistant Examiner—Joseph E. Nowicki
Attorney, Agent, or Firm—Howard N. Conkey

[57] ABSTRACT

A translucent indicator drum is rotatable to sequentially position messages representing events, which may occur at remote points in a vehicle, adjacent a viewing window. A rotary switch operated by the drum cooperates with a number of event sensors to energize a buzzer upon the occurrence of an event not represented by the message adjacent the viewing window and to energize a lamp when the drum is rotated to position the message representing the occurred event adjacent the viewing window.

2 Claims, 7 Drawing Figures

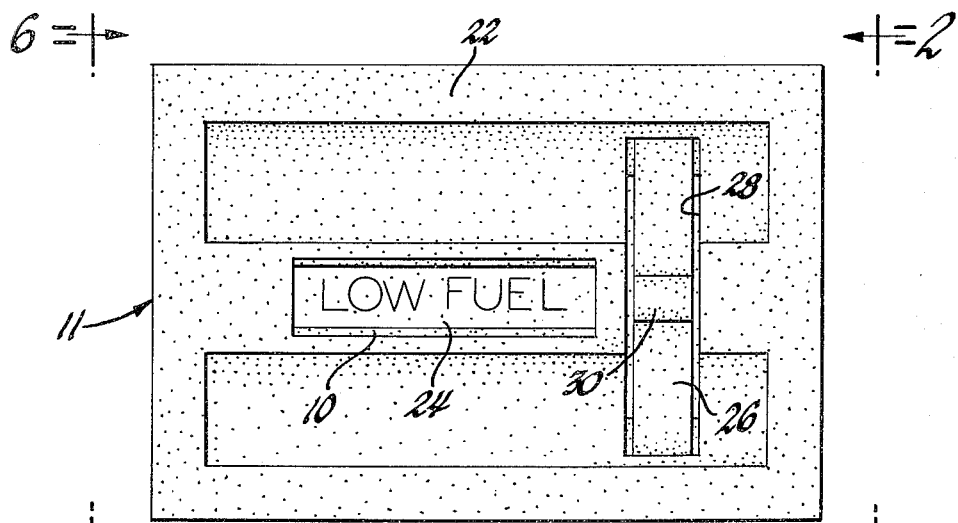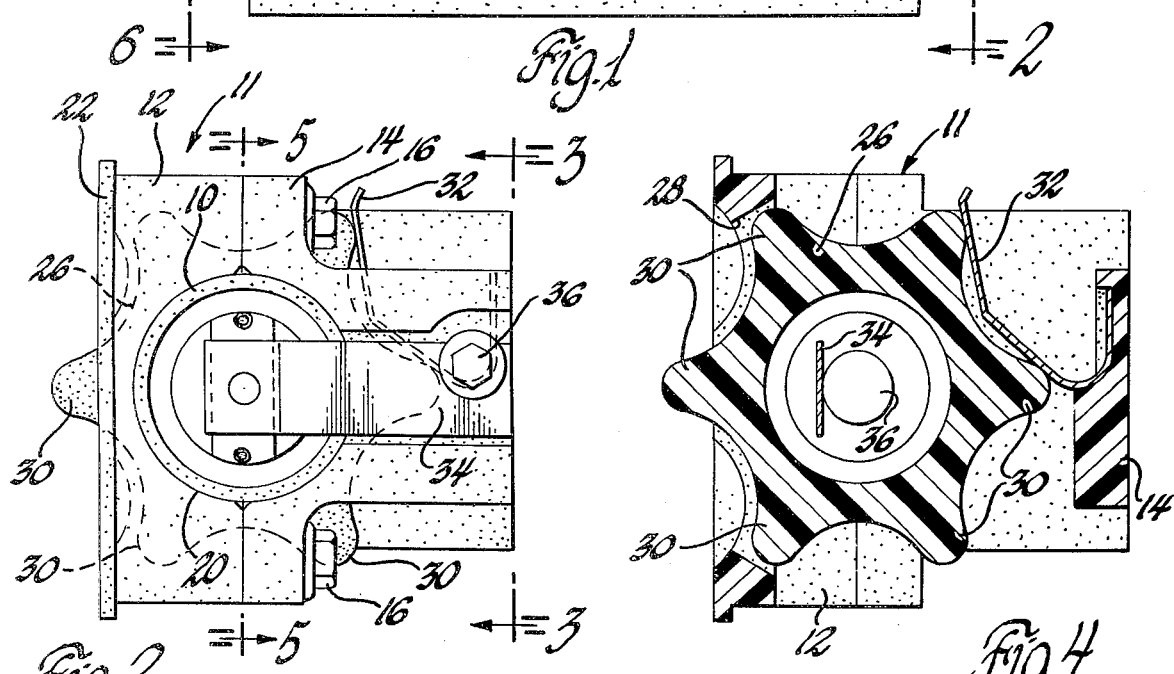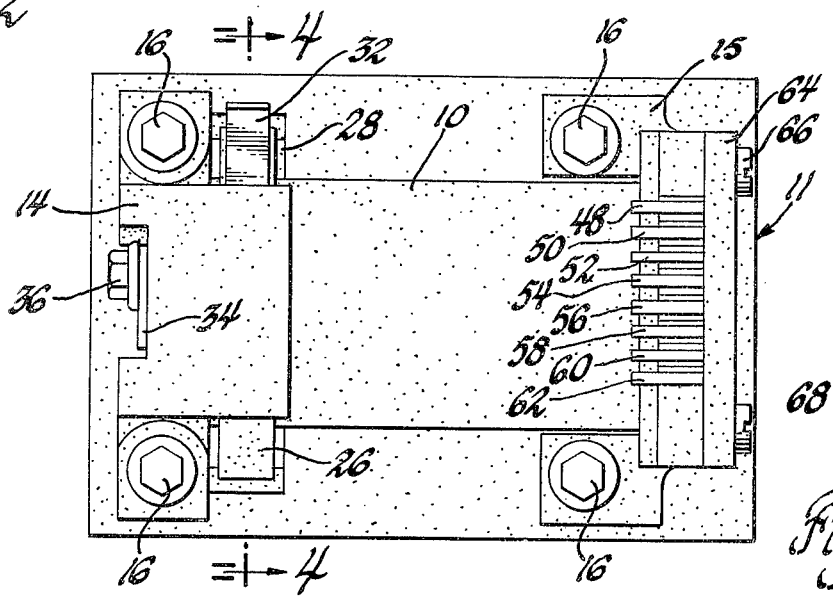

AUTOMOTIVE VEHICLE ROTARY DISPLAY AND WARNING DEVICE

This invention relates to an automotive vehicle rotary display and warning device which provides an audible indication upon the occurrence of one of a plurality of events at remote locations in the vehicle and provides an indication of the specific event which occurred when the drum is rotated to position a message representing the occurrence of that event adjacent a viewing window.

In the operation of automotive vehicles, increasing use is being made of warning indicating devices for indicating the occurrence of events at remote locations in the vehicle. For each event, there is provided a viewing window and a lamp therebehind which illuminates a message on the window upon the occurrence of the event associated therewith. Because of the increasing number of these warning devices, the space required for providing all of the desired warning indications becomes increasingly greater. It is the general object of this invention to provide a rotary display and warning device in which an audible warning is provided upon the occurrence of an event at a remote location in the vehicle and which includes a rotary display device having a plurality of messages spaced therearound corresponding to preselected events, the rotary display device being operable to provide an indication of the specific event which occurred when rotated to position the message corresponding to the occurred event adjacent a viewing window.

It is another object of this invention to provide for an automotive vehicle rotary display and warning device wherein the device includes a rotating drum having a plurality of messages thereon representing events which may occur at remote locations in the vehicle, an audible warning device and a circuit for energizing the audible warning device when a message on the drum other than the message representing the occurred event is positioned adjacent a viewing window and for energizing a lamp to illuminate the message representing the occurred event when said message is positioned adjacent the viewing window.

These and other objects of this invention may be best understood by reference to the following description of a preferred embodiment of the invention and the drawings in which:

FIG. 1 is a front view of the rotary display device of the preferred embodiment of this invention;

FIG. 2 is a drawing of the rotary display device as viewed along lines 2—2 of FIG. 1;

FIG. 3 is a rear view of the rotary display device as viewed along lines 3—3 of FIG. 2;

FIG. 4 is a sectional drawing of the thumb wheel and detent mechanism of the rotary display device as viewed along lines 4—4 of FIG. 3;

Figure 5:
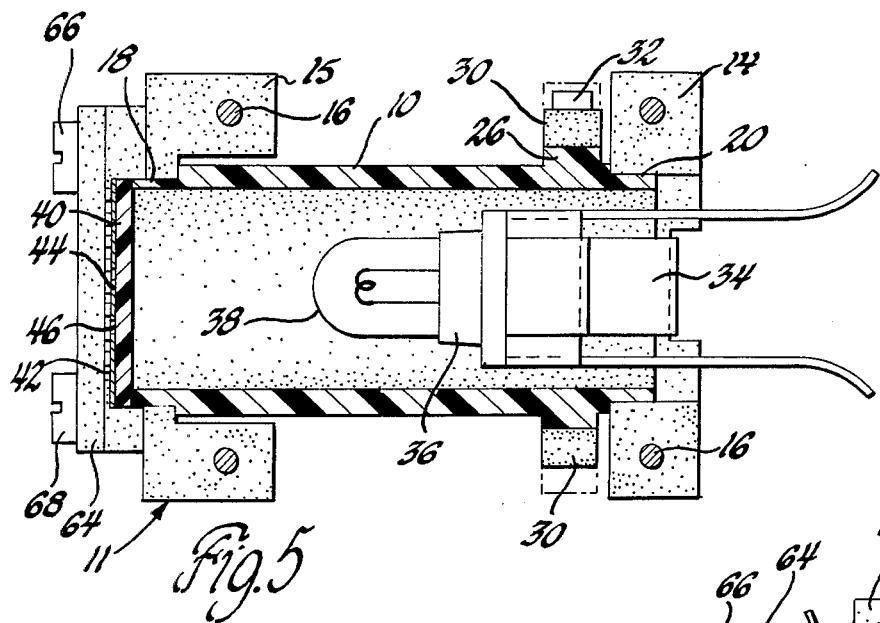
FIG. 5 is a sectional drawing of the rotary display device as viewed along lines 5—5 of FIG. 2.

Referring to the figures, a translucent insulating indicator drum 10 is rotatably carried by a housing 11 comprised of a section 12 and two sections 14 and 15 secured to section 12 by screws 16, the sections 12, 14 and 15 engaging bearing surfaces 18 and 20 of the indicator drum 10. The section 12 includes a display face 22 having a viewing window 24 adjacent the indicator drum 10. The indicator drum 10 has a plurality of messages spaced around the surface thereof which are sequentially positioned adjacent the viewing window 24 as the indicator drum 10 is rotated. The messages on the drum represent events which may occur at remote locations in an automotive vehicle, the occurrences of which are to be indicated to the vehicle operator.

The indicator drum 10 is rotatable by the vehicle operator by means of a thumb wheel 26 extending from the indicator drum 10 through an opening 28 in the display face 22. The thumb wheel 26 includes projections 30 which cooperate with a spring member 32 held by the segment 14 to form a detent mechanism which is releasably engaged each time a message on the indicator drum is positioned adjacent the viewing window 24 to form a positive angular position of the indicator drum 10 for each message thereon. As illustrated in the preferred embodiment, there are six positive positions of the indicator drum 10 corresponding to six messages thereon.

The housing 11 is mounted in the vehicle at a location such that the display face 22 is readily observable by the vehicle operator and the thumb wheel is readily reached by the vehicle operator to permit said operator to rotate the indicator drum 10 while operating the vehicle.

A bracket 34 is secured to the section 14 by a screw 36 and extends into the indicator drum through one end thereof. A lamp socket 36 is secured to the bracket 34 and carries a lamp 38 therein.

A disk 40 is secured to one end of the indicator drum 10 and includes a conducting segment 42 and a conducting segment 44 separated by an insulating portion 46. A plurality of wiper arms 48 through 62 are clamped to the section 15 by means of a bracket 64 and screws 66 and 68. Each of the wiper arms 48 through 62 engage the surface of the disk 40 to form a rotating switch operated by rotation of the indicator drum 10. The configurations of the conducting segments 42 and 44 and the relative positions of the wiper arms 50, 52, 54, 58, 60 and 62 therewith are such that one of the wiper arms 50, 52, 54, 58, 60 and 62 is engaged by the conductive segment 44 when a message on the indicator drum 10 is positioned adjacent the viewing window and further are such that the wiper arms 50, 52, 54, 58, 60 and 62 are sequentially and individually engaged by the conducting segment 44 as the indicator drum 10 is rotated to sequentially position the messages on the indicator drum 10 adjacent the viewing window 24. The remainder of the wiper arms 50, 52, 54, 58, 60 and 62 are engaged by the conductive segment 42. The wiper arm 48 engages the conductive segment 42 at all angular positions of the indicator drum 10 and the wiper arm 56 engages the conductive strip 44 at all angular positions of the indicator drum 10. Therefore, as the indicator drum 10 is rotated, each of the wiper arms 50, 52, 54, 58, 60 and 62 are sequentially and individually electrically coupled to the wiper arm 56 by the conductive segment 44 while the remainder of the wiper arms 50, 52, 54, 58, 60 and 62 are electrically coupled to the wiper arm 48 by the conductive segment 42.

Figure 6:
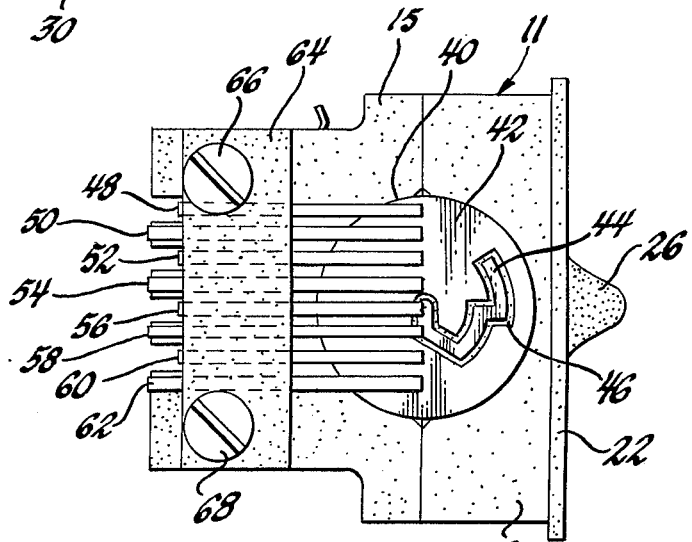
FIG. 6 is a drawing of the rotary switch operated by the indicator drum as viewed along lines 6—6 of FIG. 1.

Each of the wiper arms 50, 52, 54, 58, 60 and 62 is associated with the events represented by the message on the indicator drum 10 which is adjacent the viewing window 24 when said wiper arm is engaged by the conductive segment 44. For example, as shown in FIGS. 1 and 6, the message LOW FUEL is positioned adjacent the viewing window 24. Therefore, the wiper arm 58 is associated with the message LOW FUEL as it is engaged by the conductive segment 44 which electrically couples said wiper arm 58 to the wiper arm 56.

Figure 7:
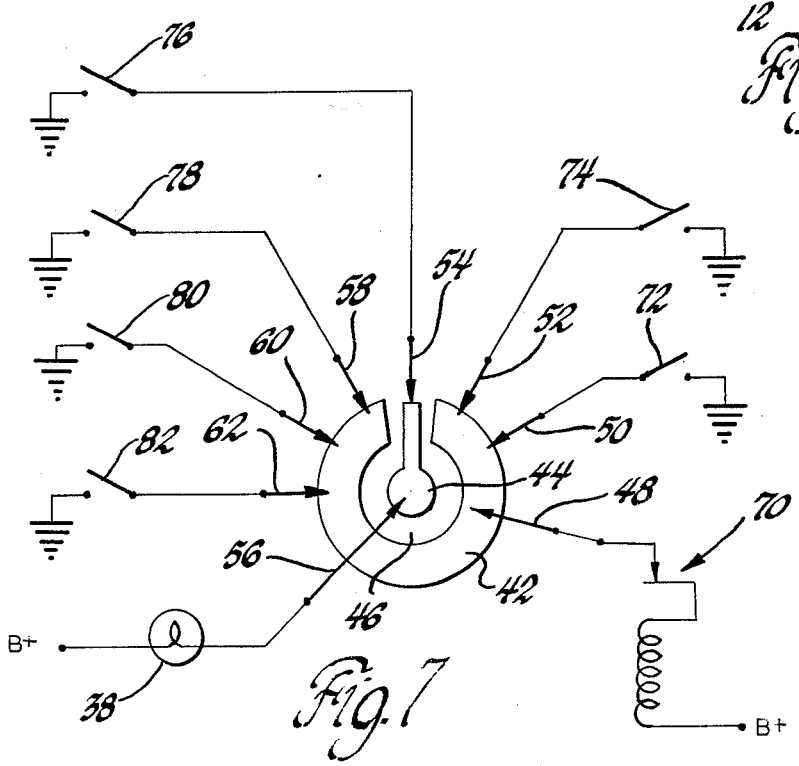
FIG. 7 is an electrical schematic of the circuit for energizing the buzzer and lamp in response to the occurrence of an event and the rotation of the indicator drum.

Referring to FIG. 7, the wiper arm 56 is coupled to a positive voltage source B+, which may be the vehicle battery, through the lamp 38. The wiper arm 48 is coupled to the positive voltage source B+ through a buzzer 70 which is positioned in the vehicle so that an audible output therefrom can be readily heard by the vehicle operator.

A plurality of normally open event sensors 72 through 82 are each closed in response to the sensed occurrence of a respective one of the events represented by the messages on the indicator drum 10. One side of each of event sensors 72 through 82 is grounded and the other side thereof is coupled to the wiper arm 50, 52, 54, 58, 60 or 62 which is associated with the event, the occurrence of which is sensed by said event sensor. For example, the event sensor 78 is closed to supply a ground signal to the wiper arm 58 when the fuel level in the vehicle fuel tank drops below a predetermined level.

In operation, upon the occurrence of one of the events, a ground signal is coupled to the buzzer 70 from one of the event sensors 72 through 82 which monitors said occurrence if the message positioned adjacent the viewing window 24 is other than the message representing said event. The buzzer 70 is energized to provide an audible indication to the vehicle operator of the occurrence of the event. To determine the specific event which has occurred, the vehicle operator rotates the indicator drum 10 by means of the thumb wheel 26 until the wiper arm which is coupled to the event sensor which monitored the occurred event is coupled to the wiper arm 56 by the conductive segment 44 to energize the lamp 38. Energization of the lamp 38 illuminates the message adjacent the viewing window 24, this message representing the occurred event. When the indicator drum 10 is in this position, the ground signal is removed from the buzzer 70 which is then deenergized. For example, if the vehicle fuel level decreases below the predetermined level, the event sensor 78 is closed to supply a ground signal to the wiper arm 48 through the wiper arm 58 and the conductive segment 42. The buzzer is then energized until the vehicle operator rotates the indicator drum 10 to position the message LOW FUEL adjacent the viewing window 24. At this position of the indicator drum 10, the conductive segment 44 is positioned to engage the wiper arm 58 to couple the ground signal from the event sensor 78 to the lamp through the wiper arm 56. When so positioned, the ground signal to the wiper arm 48 is removed to deenergize the buzzer 70 and the lamp 38 is energized to illuminate the message LOW FUEL through the viewing window 24.

The detailed description of a preferred embodiment of the invention for the purpose of explaining the principles thereof is not to be considered as limiting or restricting the invention, since many modifications may be made by the exercise of skill in the art without departing from the scope of the invention.

I claim:

1. An automotive vehicle rotary display and warning device for indicating the occurrence of events at remote locations in the vehicle, comprising: a plurality of event sensors positioned at remote locations in the vehicle, each of said event sensors being responsive to the occurrence of a respective event for generating an electrical signal upon said occurrence; a viewing window; a drum rotatably supported adjacent the viewing window; a plurality of messages spaced around the drum so as to be sequentially positioned adjacent the viewing window as the drum is rotated, each of the messages representing the occurrence of a respective one of the events; a lamp for illuminating the message adjacent the viewing window when said lamp is energized; an audible indicator; and rotary switch means operated by rotation of the drum, the rotary switch means including first coupling means for exclusively coupling the event sensor which monitors the occurrence of the event represented by the message positioned adjacent the viewing window to the lamp and second coupling means for exclusively coupling the event sensors which monitor the occurrence of the events represented by the messages positioned away from the viewing window to the audible indicator, the lamp and the audible indicator being energized by an electrical signal generated by one of the event sensors coupled thereto, whereby an audible warning is immediately provided upon the occurrence of an event not represented by the message adjacent the viewing window and the audible indicator is extinguished and the lamp is energized to illuminate the message representing the occurrence of said event when the drum is rotated to position said message adjacent the viewing window.

2. An automotive vehicle rotary display and warning device for indicating the occurrence of events at remote locations in the vehicle, comprising: a plurality of event sensors positioned at remote locations in the vehicle, each of said event sensors being responsive to the occurrence of a respective event for generating an electrical signal upon said occurrence; a viewing window; a drum rotatably supported adjacent the viewing window; a plurality of messages spaced around the drum so as to be sequentially positioned adjacent the viewing window as the drum is indexed, each of said messages representing the occurrence of a respective one of the events; a lamp for illuminating the message adjacent the viewing window when said lamp is energized; a buzzer, a plurality of wiper arms, each wiper arm being associated with a respective one of the events; means electrically coupling each of the wiper arms to the event sensor which monitors the occurrence of the event with which said wiper arm is associated; first and second conductive segments moved by the drum, the first conductive segment engaging the wiper arm associated with the event represented by the message adjacent the viewing window and the second conductive segment engaging the wiper arms associated with the events represented by the messages positioned away from the viewing window; means coupling the first conductive segment to the lamp; and means coupling the second conductive segment to the buzzer, the lamp and the buzzer being energized by an electrical signal generated by one of the event sensors coupled thereto through the first and second conductive segments, respectively, whereby the buzzer is energized by an electrical signal generated upon the occurrence of an event not represented by the message adjacent the viewing window and the lamp is energized by an electrical signal generated upon the occurrence of an event when the message representing the occurrence of said event is positioned adjacent the viewing window.

* * * * *